United States Patent [19]
Griffiths et al.

[11] 4,019,204
[45] Apr. 19, 1977

[54] FLUIDIC TRANSDUCER ACCESS OPENING IN A STACK OF FLEXIBLE RECORD DISKS

[75] Inventors: Donald Eric Griffiths, Longmont; David Gibbons Norton, Boulder, both of Colo.

[73] Assignee: International Business Machines Corporation, Armonk, N.Y.

[22] Filed: Nov. 19, 1975

[21] Appl. No.: 633,320

[52] U.S. Cl. ............................ 360/99; 360/102; 360/135

[51] Int. Cl.² ................. G11B 5/016; G11B 5/76; G11B 15/64

[58] Field of Search ............ 360/99, 102, 97, 98, 360/135, 103; 274/6, 8

[56] References Cited

UNITED STATES PATENTS

| | | | |
|---|---|---|---|
| 3,838,462 | 9/1974 | Barbeau | 360/99 |
| 3,867,723 | 2/1975 | Penfold | 360/99 |
| 3,936,880 | 2/1976 | McGinnis | 360/99 |
| 3,940,794 | 2/1976 | Griffiths | 360/99 |
| 3,969,767 | 7/1976 | Griffiths | 360/99 |

*Primary Examiner*—Robert M. Kilgore
*Attorney, Agent, or Firm*—Herbert F. Somermeyer

[57] ABSTRACT

Selectively altering air flow generates an access opening for a record surface on one of a large plurality of flexible record storage disks coaxially supported on a common spindle for rotation. Air flow through the interstices between the disks usually is sufficient to stabilize rotation of the disks. To generate a transducer access opening the air flow on one axial side of a record disk to be accessed, which includes a record surface, is altered in a manner that disks axially adjacent and facing the record surface tend to axially move together at their periphery, resulting in a peripheral transducer access opening adjacent a stabilized record disk. In a preferred form of the invention, the axial extent of the altered air flow is limited to a predetermined portion of the stack of disks for minimizing the volume of air flow change. For dual sided recording, the air flow is altered at either side of the record disk to be accessed.

42 Claims, 9 Drawing Figures

FLUIDIC TRANSDUCER ACCESS OPENING IN A STACK OF FLEXIBLE RECORD DISKS

CROSS-REFERENCE TO RELATED COMMONLY ASSIGNED PATENT APPLICATIONS

McGinnis et al., Ser. No. 484,830, filed July 1, 1974, entitled "Bistable Deflection Separation of Flexible Disks" now U.S. Pat. No. 3,936,880.

Orlando et al., Ser. No. 628,622, filed Nov. 4, 1975, entitled "Central Selection and Counting of Bistable Disks".

BACKGROUND OF THE INVENTION

The present invention relates to record storage apparatus employing a stack of flexible record storage disks and particularly to methods and apparatus for accessing a record surface on any selected one of the disks in a stack of disks.

The above-identified, commonly assigned, copending, patent applications claim and disclose inventions related to generating access to a record surface in a stack of flexible disks using alterations of air flow (hence, pressure) for facilitating generating an access opening. Other means of generating an access opening include insertion of a disk separator from the outer peripheries of the disks, such as shown in U.S. Pat. No. 3,852,820 and 3,838,462. The method of fluidic access opening generation appear to have certain advantages over mechanically generating an access opening in reduced wear of the disk surfaces. Changing air flow requires a certain amount of time. This time requirement means increased access time to a record surface. In a data processing system, such increased accessing time diminish the value of the record storage apparatus within a data processing system by increasing the total cost of operation of the system. Accordingly, it is desirable to reduce the change in air flow to a minimum while rapidly generating a transducer access opening employing fluidic actuation techniques.

SUMMARY OF THE INVENTION

An object of this invention is to enable transducer access opening generation employing fluidic techniques while tending to minimize the volume of air subjected to air flow changes while rapidly generating a transducer access.

In accordance with one aspect of the invention, a method of creating a transducer access opening to a record surface of a given disk in a stack of commonly rotating flexible record disks is to alter the air flow on the record surface side of the given disk immediately axially adjacent thereto such that predetermined disks axially facing and being adjacent to the record surface tend to axially move together at the peripheries. This is done in a preferred form by reducing the air flow below that of a stabilizing air flow to create a collapsing fluidic condition adjacent the record surface, while maintaining rotational stability of given disks for facilitating transducing operations. In another form of the invention, a bistable air condition is created in disks axially remote from the record surface but adjacent the collapsing disks.

In a preferred method, a jet of air first induces a slight axial enlargement of spacing. Then, air flow is reduced between disks adjacent the slightly enlarged spacing. The resulting axially closer spaced disks are preferably in a stable condition of reduced air flow, and axial spacing.

Apparatus employing the invention in a most preferred form, includes a piston axially movable inside a tubular spindle supporting the record storage disk. The piston alters air flow between disks axially aligned with the piston in a manner to generate a transducer access opening while permitting the remainder of the stack of disks to rotate in a stabilized condition. In a specific aspect, a tubular piston has air flow altering portions, a first portion for creating an axial space collapsing air flow, with a second portion creating a bistable air flow condition; both portions operatively associated with a limited predetermined number of record storage disks for minimizing air flow changes within the stack of disks while generating a transducer access opening. A revision of the first aspect is continuous alteration of air flow/pressure along the axial length of the piston as by varying piston wall porosity. In another form of the invention, the air flow is modified by moving an annular control ring or other peripheral air flow control apparatus axially at the outer peripheries of the record storage disks.

The foregoing and other objects, features, and advantages of the invention will become apparent from the following more particular description of the preferred embodiment, as illustrated in the accompanying drawing.

DETAILED DESCRIPTION

Figure 1:
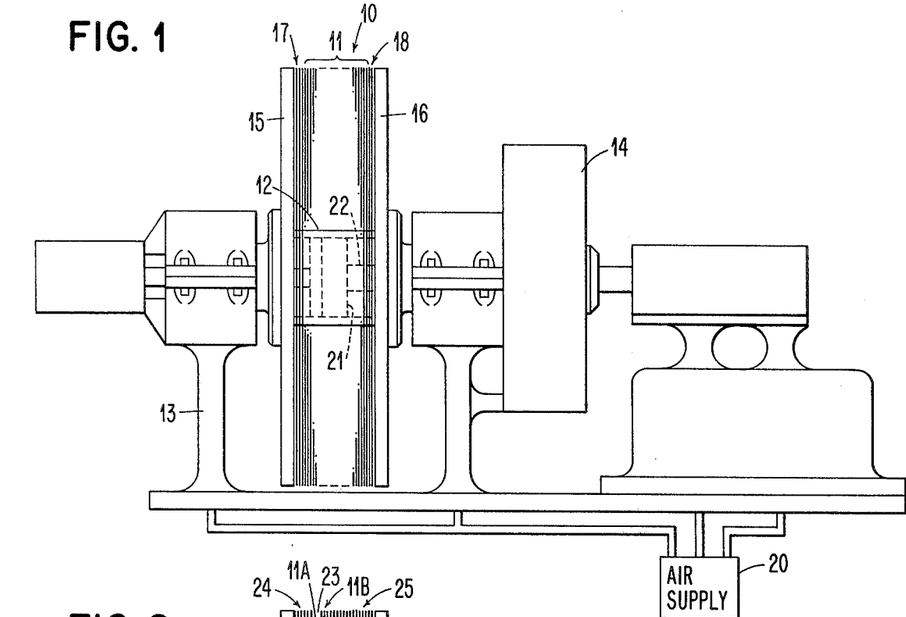
FIG. 1 is a diagrammatic showing of a record storage apparatus employing the present invention and wherein the disks are rotating in a fully stabilized condition.

Referring now more particularly to the drawing, like numerals indicate like parts and structural features in the various views and diagrams. Record storage apparatus incorporating the present invention shown in FIG. 1 has a stack 10 of a plurality of flexible record storage disks 11 mounted at their centers on a tubular spindle 12 for rotation about a common axis. Frame 13 supports spindle 12 for rotation at its axially opposite ends. Motor 14 rotates the stack 10 at a constant angular speed. A pair of stabilizing end plates 15 and 16 assist in stabilizing rotation of the stack of disks. Such end plates are preferably more rigid than record disks 11. Intermediate plates 15 and 16 and the record disks 11 is a plurality of buffer nonrecord flexible disks 17 and 18 which permit the axially extreme record disks to be accessed, as will become apparent. As later explained, there may be fewer buffer disks 18 than buffer disks 17. Stack 10 is constructed in accordance with Penfold et al. U.S. Pat. No. 3,867,723, wherein air from a central supply 20 flows through tubular spindle 12 and, thence, radially outward through interstices between adjacent ones of the disks 11, 17, 18 for stabilizing same. In accordance with McGinnis et al., supra, the transducing access can be achieved from the center spindle 12 by utilizing a central selection piston 21 which is axially movable inside spindle 12. In accordance with the present invention, the central selection taught by McGinnis et al., supra, is enhanced by limiting the volume of air subjected to air flow/air pressure changes and while maintaining a major portion of stack 10 in a stabilized rotational state, as taught by Penfold et al, supra. Further, certain advantages occur by having a non-rotatable central selection piston, no limitations thereto intended.

Figure 2:
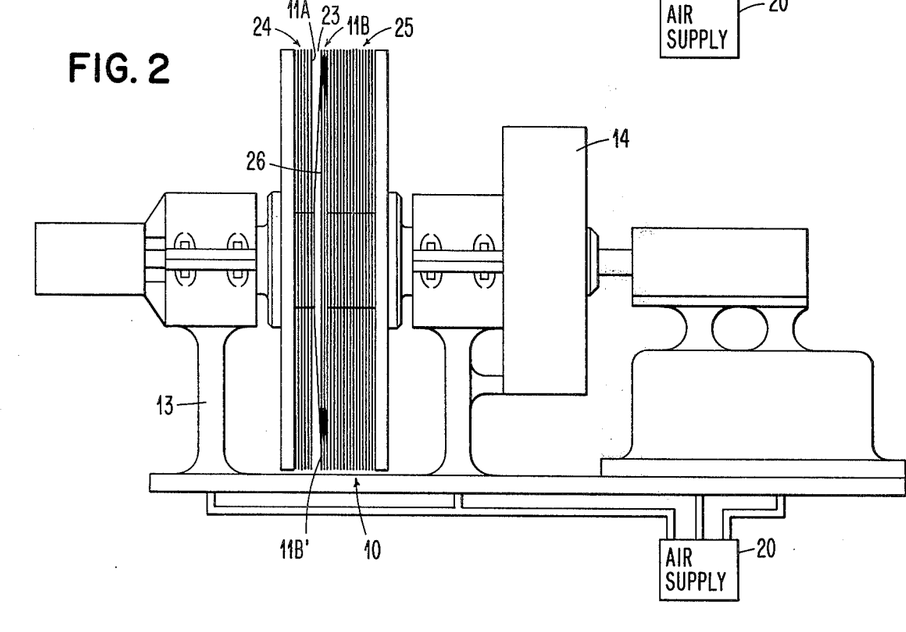
FIG. 2 is a diagrammatic showing similar to that of FIG. 1, but showing a transducer access opening generated by practicing the present invention.

To achieve an access opening with minimal air flow change, the piston 21 has its own separate air supply tube 22 connected to another air supply (not shown in FIGS. 1 and 2), such as is later described. In accordance with this invention, as shown in FIG. 2, an annular access opening 23 is created adjacent a record disk 11A rotating under stabilized influence of air moving radially outwardly from tubular spindle 12, while axially adjacent disks 11B axially move away from disk 11A at their outer peripheries to create annular access 23. The term "access opening" is also termed "stack split"; closing an acess opening also "closes" the stack (pack) to fully space the disks as later described. Disk 11B' adjacent disk 11A folds back on itself assuming a shallow dish shape with a convex surface 26 facing record disk 11. Positioning of piston 21 and appropriate resultant controlled air flow, which is altered from the stabilizing air flow in areas 24 and 25 of stack 10, creates annular access opening 23 with minimumal air pressure/movement changes, as will become more apparent.

Figure 3:
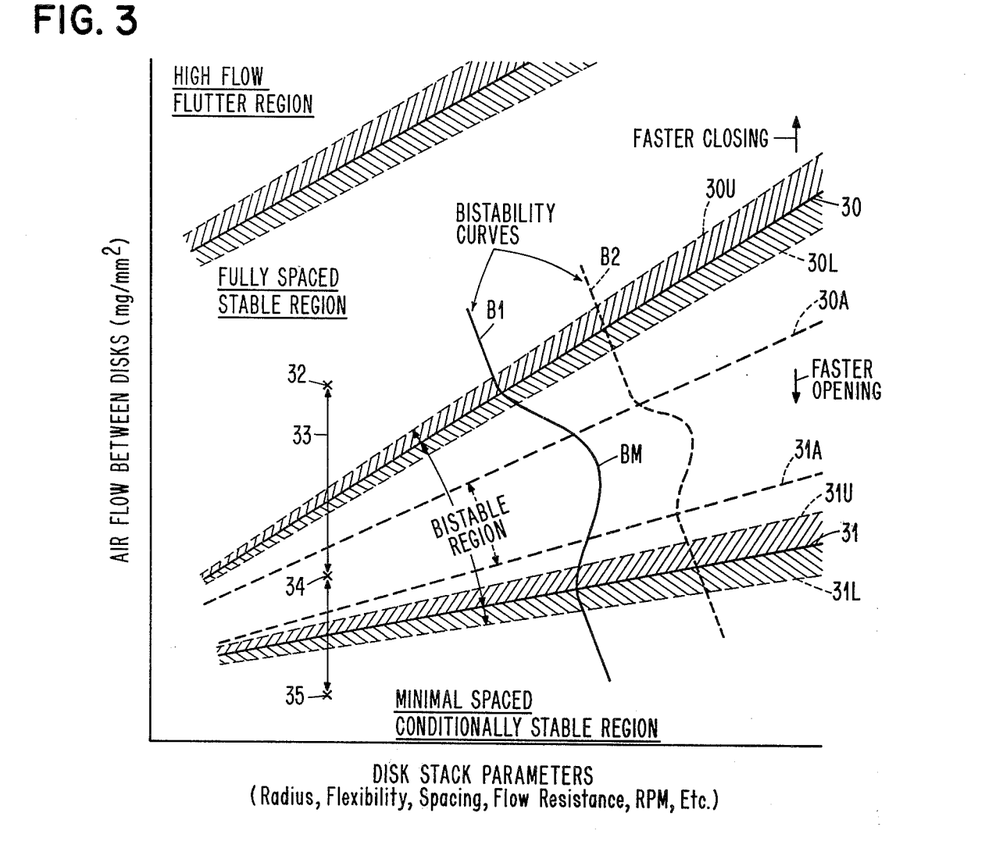
FIG. 3 is a graphical representation of the fluidic states within a stack of rotating flexible record storage disks.

Before proceeding into a more detailed discussion of the operation of the invention, the effect of fluid flow and pressure on the rotational stability of the record disks will be first described with particular reference to FIG. 3. The vertical ordinate represents air pressure between adjacent disks. As air flows from tubular spindle 12 to the interstices between adjacent record disks 11, the stabilization of rotation of such disks is enhanced. As the pressure is decreased (the air flow is reduced), the stability of rotation tends to decrease. Along the horizontal ordinate, stack operation generally varies from a more stable region to a less stable region. Another way of stating these characteristics is that in the areas of lesser stability, a greater air flow, move upon the vertical ordinates is required to achieve rotationally stable flexible disks. The parameter variations represented by the horizontal ordinate are a composite of radius (increase radius reduces stability), flexibility of the disks (increased flexibility increases response to fluid flow hence reduces stability), spacing between the disks, rotational speed, and the like. Hence, it is seen that FIG. 3 is a simplified version of a family of curves which completely portrays the operational characteristics of record storage apparatus with which the invention is advantageously employed. For a better understanding a simplistic explanation of the operation is first presented, followed by a more complete explanation. For brevity and simplicity, only an exemplary composite curve is shown.

Tests of the subject invention, used flexible disks consisting of magnetic oxide coated polyester disks having a thickness ranging from about 0.025 millimeter to about 0.007 millimeter. Disks having diameters up to about 400 millimeters rotated at about 1,800 rpm and were stabilized primarily by the air flow between the disks, as taught by Penfold et al., supra. As the thickness and the mass of the disks are increased (the flexibility is reduced), the internal constructional features of the individual disks tend to control the rotational stability. Even with these heavier disks, air flow can still have a significant effect, but a less responsive effect than if used with apparatus employing disks of 0.025 millimeter thickness. When the air pressure is sufficient to cause a stabilizing air flow, as described in Penfold et al., supra, the flexible record disks 11 are fully spaced in substantially parallel relationship represented by the region of graph of FIG. 3 above line 30 and labeled "Fully Spaced Stable Region". It should be remembered that air flow requirements for stability increase with the radius and flexibility of disk parameters. On the other hand, excessive air flow results in a so-called "ventilated pack" characterized by excessive disk flutter indicated at the top of FIG. 3.

If the air flow is reduced by reducing the pressure below the threshold represented by line 30, a so-called "bistability" of disk spacing is generated in accordance with McGinnis et al., supra. In this so-called "bistable" region, the disks can either rotate in a stable manner, as described by Penfold et al., or can be more closely spaced at the outer periphery, as fully described by McGinnis et al. Further reducing the air pressure and, hence, the air flow below the lower threshold 31 causes the disk spacing to be collapsed, wherein the rotational stability of the disks is in the closed state represented by the area of the graph in FIG. 3 labeled "Minimal Spaced Conditionally Stable Region". In the area of rotational represented by the area below line 31, the disks are incapable of being predictably fully spaced at the outer periphery the rotational stability at reduced air flow and axial spacing is comparable to the fully-spaced stable state. Further reducing air flow results in instability (excessive flutter) using the stack described above, the minimal spacing is stable for about fifty disks. The entire stack was characterized by multiple unpredictable "access openings" or stack splits with small groups of minimal spaced stably rotating record storage disks.

The vertical space between lines 30 and 31 also represents a hysteresis in the rotational operational characteristics of record apparatus constructed to use the present invention. For example, if a record storage apparatus is operating at a point 32 in the fully spaced stable region, variation of pressure along line 33 to point 34 in the bistable region may result in no change in axial spacing between adjacent disks. However, exterior forces, such as a disk separator blade, can cause the disks to axially separate at the periphery, as taught by McGinnis et al. Assume for purposes of discussion that at 34 the disks have remained fully spaced. Then, by further reducing the pressure to point 35, the disks at the outer peripheries close together, i.e., rotate in a minimal spaced stable relationship. When moving from point 34 to point 35, disk 11 will be fully spaced until line 31 is crossed. Upon returning to the fully spaced stable region, when moving from point 34 to point 32. The disks (unless otherwise activated) will remain at the minimal spacing until line 30U is crossed. The hysteresis (the extent of the bistable region), as represented by different pressures in the disk stack 10, increases as the stability of rotation tends to decrease for a given air pressure. It has also been found that the extent of hysteresis and the extent of the bistable region, in terms of pressure, are controllable by proper selection of disk spacing, radius, disk flexibility, and the like, all of which are beyond the scope of the present description. In some applications, it may be desirable to have a very narrow bistable region; while in others, a rather wide bistable region, as indicated in FIG. 3, is desired. In practicing the present invention, a relatively wide hysteresis zone is desired. A wide zone reduces sensitivity of stack 10 to pressure and flow changes yielding a lower cost predictably operating storage apparatus. The extent of this zone will be more fully described with reference to FIGS. 4 et seq which illustrate the detailed operational features of the present invention.

The above simplistic explanation of FIG. 3 does not count for a continuum of parameter changes; that is, as operation of the stack moves from the region above line 30 into the bistable region, there is no discontinuity at line 30. Rather, there is a gradual change from fully spaced stability to bistable, as represented by the hatched areas between dash line 30U and 30L. At line 30U, the tendency for the stack is to remain fully spaced. It is possible by applying a transistory force to generate a small access opening 23. Above line 30, there is a tendency for the access opening to close to the fully spaced stable operation. Within the definition of bistable by McGinnis et al., the bistable region extends up to line 30U. Below line 30, i.e., between lines 30 and 30L, the access opening 23 again is relatively small—there is a tendency for the access opening to reduce, but this action is much slower than the closing between lines 30U and 30. Depending upon the parameters of the stack under observation, bistable operation in the vicinity of line 30U depends on other parameters; i.e., it may stay open a certain time and at other times close rapidly. One such parameter is in axial position within the stack 10 of disks.

In general, as one goes upwardly on the vertical ordinate, the access opening 23 tends to close faster; whereas if one goes downwardly on the vertical ordinate, the access opening is generated faster. This feature is represented in the two bistability curves B1 and B2 superposed on the other curves. Bistability means the capability of the stack to support either an access opening 23 or a closure of such access opening without reversion to the other state. The upper portion of curves B1 and B2 represent the tendency of the stack to become fully spaced stable, i.e., access opening 23 becomes closed. At line 30, i.e., in the region between lines 30U and 30L the bistability characteristic becomes pronounced. Midway between lines 30 and 31, as at BM, the bistability is maximum. The bistability reduces as one approaches line 31 into the minimal-spaced conditionally stable region. Around line 31, in the zone between lines 31U and 31L access opening 23 is easily formed. However, the closure of the pack becomes more difficult. At line 31L, the closure becomes problematical in the same manner that the opening at 30U became problematical. Again, there is a continum of parameter changes including bistability characteristic.

As mentioned above, it is desired to have a rather wide bistable region. Examination of FIG. 3 shows that a variation of pressure, i.e., movement along the vertical ordinate, reflects changes in air pressure and disk stack operation. By having bistable regions wide, changes in operation of the stack will be entirely within the bistable region; hence, will not move into either the fully spaced stable region or the minimal-spaced conditionally stable region. By changing design parameters, the width of the bistable region can be reduced as represented by dash lines 30A and 31A. Increasing the flexibility of the disks, i.e., making them thinner and more responsive to changes in the stabilizing fluid flow, the bistable region reduces. Similarly, if the resistance to air flow is increased, the region will also be narrowed; that is, if the air flow spacers of tubular spindle 12 provide flow resistance, the region becomes narrower. With a narrow region, the stack is more responsive to small changes in pressure and air flow and, hence, requires more critical and precise controls. With the wide bistable region, there is an ease of control. With relatively large air flow, the region is relatively wide. In designing a stack, one has to consider the cost of the blower (purchase price plus cost of operating) versus the ease of control factors. It should also be appreciated that the radius rotational speed, spacing between disks, etc., also affect the state of the bistable region.

Figure 4:
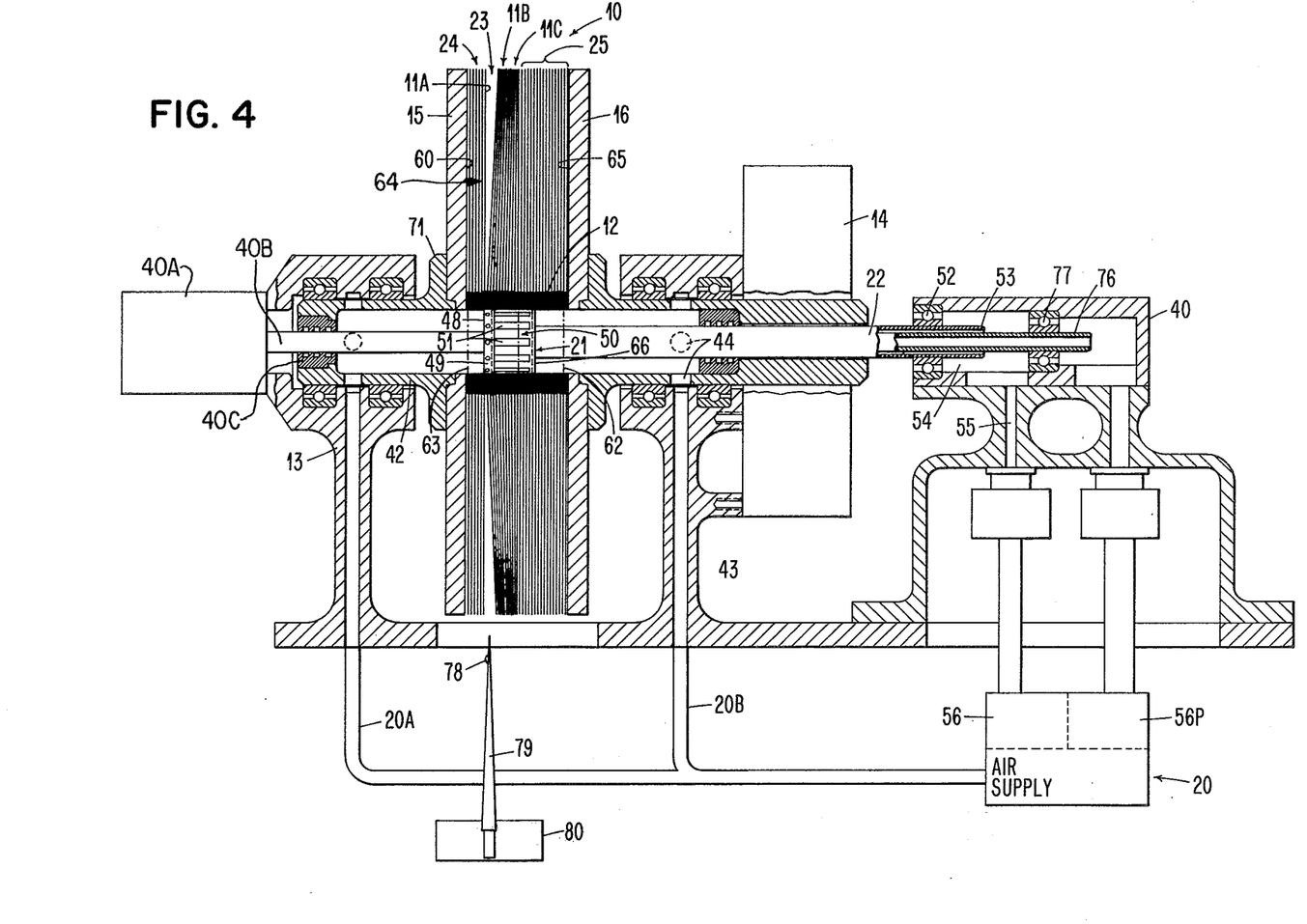
FIG. 4 is a diagrammatic showing in an axial cross-sectional view of record storage apparatus employing a first embodiment of the present invention.

An early embodiment of the present invention is shown in FIG. 4 wherein axially movable piston 21 is fixedly secured to a free end of axially elongated support tube 22, which in turn is journaled for rotation end block 40. End block 40 is disposed on frame 13. Rod 40B connects voice coil motor 40A to piston 21. Seal 40 C provides an air seal to the center of tubular spindle 12. In view that piston 21 and the inner wall of tubular spindle 12 form an effective air seal, air supply 20 had fluid communication with both axial ends of tubular spindle 12. As shown in FIG. 4, air supply 20 supplies stabilizing air pressure through tubular support shaft 42 via tube 20A to the center of tubular spindle 12. This arrangement supplies air to that portion of the disk pack for stabilizing disks in area 24. At the opposite axis end, air supply tube 20B supplies stabilizing air pressure through tube 43, thence, apertures 44 to tubular spindle 12 for stabilizing disks in area 24. Motor 14 is coaxially disposed over tubular shafts 22, 71.

Piston 21 has a transducer access opening front edge 48 adjacent an air blocking portion 49, which in turn is adjacent a bistable air pressure supplying portion 51. Front edge 48 identifies and selects record disk 11A for transducing access. All disks to the left of disk 11A, as seen in FIG. 4, are in area 24 and have stabilized air flow; hence, are rotating in a stabilized rotational condition. To the right of disk 11A, a first set of disks 11B, which is generally axially aligned with air pressure blocking portion 49 of tubular piston 21, is in a minimal spaced stable rotational region shown in FIG. 3. Further, disks in area 11C axially aligned with the bistable generating portion 51 of piston 21 also tend to move together at the outer peripheries; i.e., the air pressure existing between adjacent disks in areas 11B and 11C is less than that in areas 24 and 25. As a result, annular transducer accessing opening 23 exists between disk 11A and the closest disk surface 26 of group 11B disks. The access opening front edge 48 of tubular piston 21 is preferably somewhat aligned with the plane of the record storage disk 11A to be selected.

Bistable portion 50 of closed tubular piston 21 passes the bistable inducing air through a series of ports 51 which are uniformly, circumferentially disposed about the piston 21 periphery. The inside of piston 21 is a small plenum receiving the bistable inducing air through elongated tube 22, which in turn is journaled for rotation in end block 40 at 52. The axial end 53 of tube 22 is in fluid communication relationship with a plenum 54 integrally formed in slide 40. Plenum 54, in turn, receives bistable inducing air pressure through passageway 55 from bistable air source 56.

In one version of a constructed embodiment of the present invention, bistable source 56 was continuously operated such that annular access opening 23 always existed in the stack of disks 10. As piston 21 was axially moved, access opening 23 followed the front access opening generating edge 48. In an alternative embodiment, an actuating switch (not shown) turned bistable source 56 on to supply bistable air; while at other times, it supplies stabilizing air such that access opening 23 is more poorly defined. Because of reduced access time, it is preferred that bistable source 56 continuously supplies bistable inducing air pressure to tube 22 and section 50 of piston 21.

The axial pressure profile of piston 21 is from a minimal pressure adjacent front edge 48 to almost stabilizing pressure adjacent rear circular surface 66. In an alternative piston construction, the circumferential wall of piston 21 has a porosity varying from a minimal porosity adjacent front edge to a maximum porosity adjacent rear circular piston wall 66. Such variable porosity may be achieved in several ways including a different number of apertures in the circumferential wall, different aperture sizes, air permeable cast bronze, etc.

The stroke of piston 21 in tubular spindle 12 extends from immediately adjacent face 60 of rigid stabilizing end plate 15 to either dotted line 63 or 62, as will be described. At the bottom of the stroke of piston 21, as near face 60 of rigid disk 15, it is preferred that the stroke be terminated at dotted line 63 to avoid inadvertent contact with face 60. Additionally, it has been found that, as piston 21 approaches face 60, perturbations may be introduced into the rotational stability of the disks 64 adjacent face 60. If a new buffer disks, for example, up to 10, are disposed between face 60 and the last record storage disk, the last storage disk is protected from abrasion and other damage by inadvertent contact with face 60.

At the top of the stroke (adjacent rigid end stabilizing plate 16), design choice can be exercised more freely for selecting the length of the stroke of piston 21. It is preferred that the stroke of piston 21 be as long as possible and encompass the maximum number of disks. However, accommodation must be made for the axial movement of disks in regions 11B and 11C with respect to annular access opening 23. In one constructed embodiment, access opening 23 had an outer axial maximum extent of les than 3 millimeters. Adding another 3 millimeters to accommodate disks in regions 11B and 11C, the record storages closest to rigid stabilizing end plate 16 should be not less than nine millimeters from face 65; that is, dotted line 62 should be 9 millimeters from face 65. Such criteria can be used to determine the design parameters for slide 40, piston 21, and tube 22. On the other hand, it may be desired that circular end face 66 of piston 21 stop axially adjacent face 65. In this latter instance, bistable region 11C at the bottom of the stroke will be at 61, i.e., substantially the axial length of piston 21 from face 65.

It should be appreciated that the axial extents of regions 11B and 11C are determined in large part by disk parameters, i.e., flexibility, radius, speed of rotation, plus the spacing intermediate the disks. In one constructed embodiment, disks 11 were spaced on 0.2 millimeter centers and had a diameter of approximately 325 millimeters. The axial extent of region 11B was held to about 25 disks, while the axial extent of 11C was held to less than 100 disks. This indicates that the spacing between record disk 11A to be accessed and the fully stabilized disk facing record disks 11A, as disks 11B, 11C was about 125 disks. Different disk-stack parameters will change these numbers.

It should be appreciated that as the disk parameters are varied, spacing between adjacent disks also varies. Because of the constraint of the bottom of the stroke of piston 21, it is desired that the axial spacing between disks 11A be minimized. This is best done by minimizing the axial extent of annular access opening 23. While the actual axial extent could be reduced by increasing the spacing between disks, this is not desired because of reduced volumetric efficiency of storing data. Variably spaced disks can be employed, such as taught by Griffiths et al., Serial No. 480,990, filed June 19, 1974, a commonly assigned application. In any event, in accordance with the invention, the number of buffers for intermediate disks between the rigid stabilizing plates 15 and 16 is reduced by practicing the invention in that the number of buffer disks at the top of the stroke adjacent face 60 is substantially reduced, while the number of buffer disks adjacent surface 65 near the bottom of the stroke can be selected as above described.

Rigid disk plate 15 has an axially outwardly extending boss 71 having shaft 42 journaled for rotation in frame 13 for supporting end plate 15 and, hence, tubular spindle 12. Further, since piston 21, support tube 22, 71 are journaled in slide 40, piston 21 rotates with stack 10. This arrangement requires rotatable air seals in slide 40. It is also preferred that in constructing tubular spindle 12, it be precisely bored for its entire axial length for ensuring no interferences in the sliding action of piston 21. It is also preferred that the outer periphery of piston 21 by of nylon or other antifriction material to facilitate axial movement and precise positioning of the piston.

Piston 21 includes circular end at 48 and which close off the piston from the center of tubular spindle 12. In another constructed embodiment (FIG. 6), bistable producing portion 50, instead of having a plurality of slots 51, was merely open to the inner tubular wall of spindle 12. In this instance, the circular end plate 15 must have substantial rigidity to ensure a good air seal between the inside of tubular spindle 12 and the plenum formed within piston 21.

To assist in forming annular access opening 23, a set of jet ports (may be slits) are circumferentially, evenly disposed about the periphery of piston 21 and extend into end plate 15 for establishing fluid communication with a high-pressure air transmitting tube 76 disposed coaxially with air pressure tube 22. Tube 76 is journaled in slide 40 at 77 and is in fluid communication with a pulsed air supply 56P within supply 20. Air supply 56P is activated by means not shown a little before the pulsed bistable source 56 is activated, or it can be continuously providing jets of air; preferably pulsed just prior to the insertion of a transducer 78 carried by radially movable arm 79 on axially movable carriage 80 into annular access opening 23. The latter is preferred since the jet of air will ensure that annular access opening 23 reliably occurs at a given location and expands to a desired maximum axial spacing. It has also been determined that if the air jet precedes application of bistable condition inducing air flow, annular access opening 23 opens faster than if simultaneously or subsequently applied.

Piston 21 control portions 49 and 50 may vary in construction while accomplishing the abovedescribed functions. For example, portion 50 may actually provide radially outwardly flowing air at a reduced pressure from that provided from air source 20. Portion 49, instead of blocking flow of air from the disks in region 11B, may be connected to a pulsing vacuum source (not shown) which actually causes a momentary reverse flow of air; i.e., the air flows momentarily radially inwardly and at other times radially outwardly. The latter tends to cause the disks in region 11B to move together more rapidly. Additionally, the pressure provided by portions 49 and 50 to the disks in the areas 11B and 11C, respectively, may vary in accordance with the operation of the device; that is, immediately prior to insertion of transducer 78 into access opening 23, air can be jetted through ports 75, a vacuum or reverse air flow pulled through portion 49, and a slightly less pressure momentarily provided through portion 50, which then can be increased to a desired bistable air pressure once the transducer in portion 49 enters access opening 23. Also, the vacuum may be of relatively short duration. Because time is of essence in the insertion of transducer 78 into access opening 23, various design parameters to achieve minimum time required to generate an access opening or to ensure the access opening is sufficient and various choices can be made depending upon the characteristics of the stack of disks being employed. To pull a vacuum through portion 49, it is fitted with ports (not shown) and connected to a vacuum source (not shown) via a tube (not shown) in the same manner that portion 50 connects to source 56 via tube 22.

It is desired that the maximum axial extent of access opening 23 be minimized. That is, a small opening is achievable in the shorter period of time than a large opening. However, this has to be offset with the positioning accuracy and speed of axial movable carriage 80 and radially movable head support arm 79. Further, the techniques of this present invention can be combined with that in the copending, commonly assigned application of Griffiths et al., Ser. No. 480,990, filed June 19, 1974, wherein the initial opening of the stack 10 is in accordance with the teachings of the present invention wherein the opening axial extent is less than that necessary to accommodate radial arm 79. Insertion of radial arm 79 into such partial access opening partially moves the disk 11B axially as taught in Griffiths et al., supra. In this manner, the positioning accuracy requirements of axially movable carriage 80 are reduced while permitting facile and assured access to stack 10 and overlapping operations of the radial access of transducer 78 with the formation of a transducer access opening of sufficient axial extent to accommodate arm 79. This is particularly useful whenever ports in portion 49 provide an additional surge of air past disk 11A and those of 11B to ensure that arm 79 and the adjacent disks do not come into damaging contact. Carriage 80 and radial arm 79 may be constructed as shown in Griffiths et al., supra and provide an additional jet of access opening air coincident with an internal air jet via port in portion 49.

Figure 5:
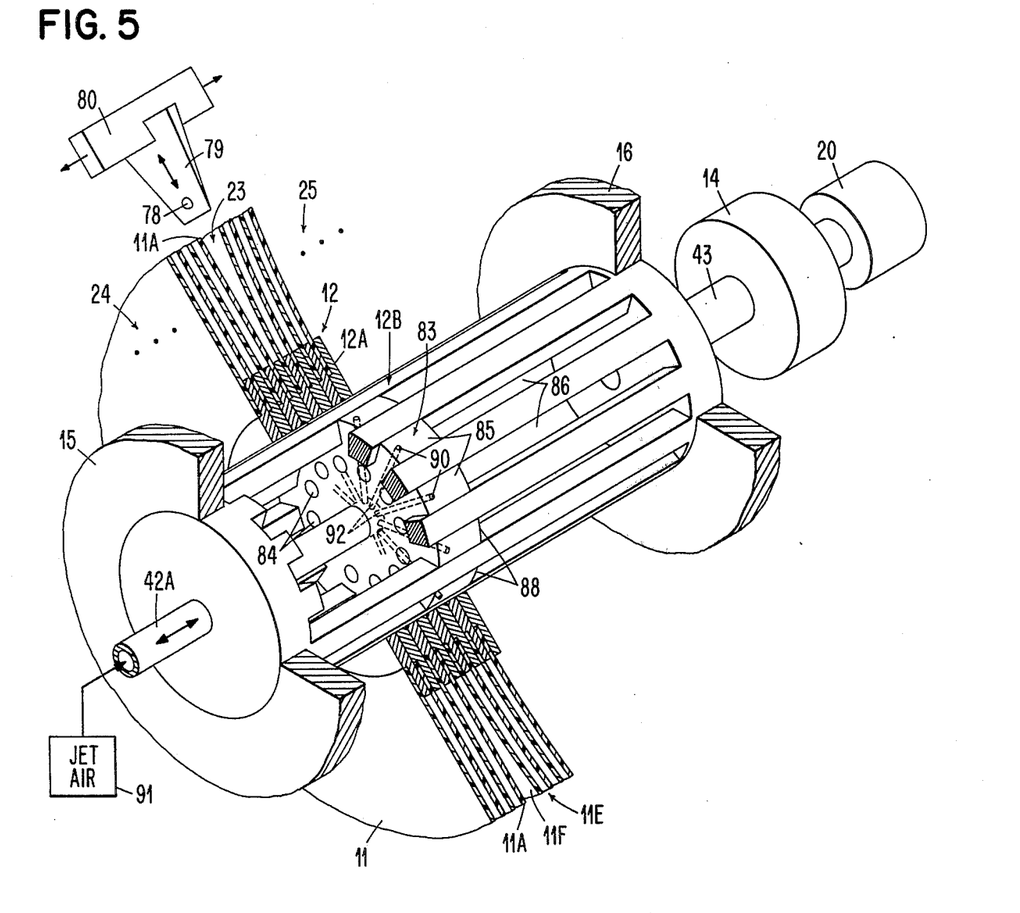
FIG. 5 is a simplified diagrammatic perspective cutaway drawing of a modification to the FIG. 4 illustrated embodiment.
Figure 7:
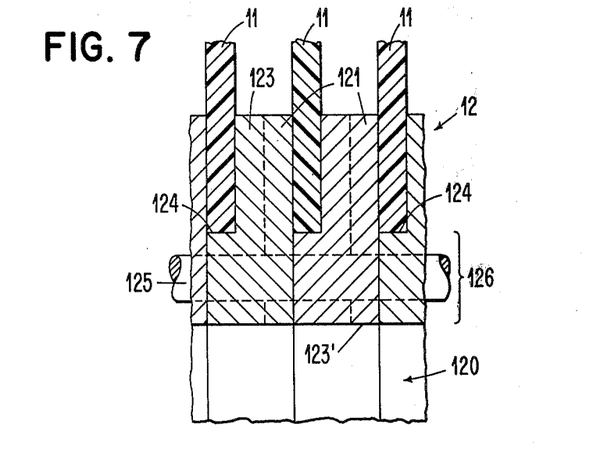
FIG. 7 diagrammatically shows one construction of a tubular spindle usable with the FIGS. 1, 2, illustrated apparatus.

A modification of the FIG. 4 illustrated embodiment is shown in abbreviated diagrammatic form in FIG. 5, it being understood that the constructional features detailed in FIG. 4 are equally applicable to FIG. 5, such as the FIG. 4 illustrated journaling, slide 40, and the like. In this embodiment, tubular spindle 12 has an outer section 12A constructed as shown in FIG. 7, plus an inner axially slotted section 12B for axially movably receiving central disk-selecting piston 83. Air from source 20 enters the center hollow portion of the inner section 12B via inlet tube 43 to supply stabilizing air flow for the plurality of disks 11 affixed to section 12A between rigid stabilizing plates 15 and 16. Piston 83 has a plurality of axially opening apertures 84 permitting the stabilizing air to be on both axial sides of the piston for stabilizing the disks in regions 24 and 25, as shown in FIG. 4. To select a record surface via an enlarged annular access opening 23, such as to disk 11A, piston 83 is axially positioned axially adjacent the disk to be selected by a voice coil motor (not shown) attached to tubular shaft 42A. Piston 83 has a plurality of radially outwardly extending air blocking teeth 85 movably disposed in the axially extending slots 86 of inner section 12B. Teeth 85 block the air from the disk to be axially spaced closer together as at 11E generating annular access opening 23 to reduce the air flow, reducing the air pressure between the disks in region 11E to the conditionally stable region below line 31 of FIG. 3. A second annular access opening (not shown) is created at the opposite axial edge 88 of teeth 85. Since it is preferred to record on only one surface of the record disk 11, annular access opening at 87 is not used. In the event double-sided recording is used, then it can be used in the same manner in which access opening 23 is utilized.

To ensure that access opening 23 occurs immediately adjacent record disk 11A to be accessed and in a rapid manner, a plurality of air jet ports 90 in teeth 85 receive jet air from source 91 via tube 42A and radial capillary air tubes 92 in piston 83. Air is jetted from ports 90 to between disks 11A and 11F to ensure that disk 11F radial outer portion moves axially away from disk 11A.

Figure 6:
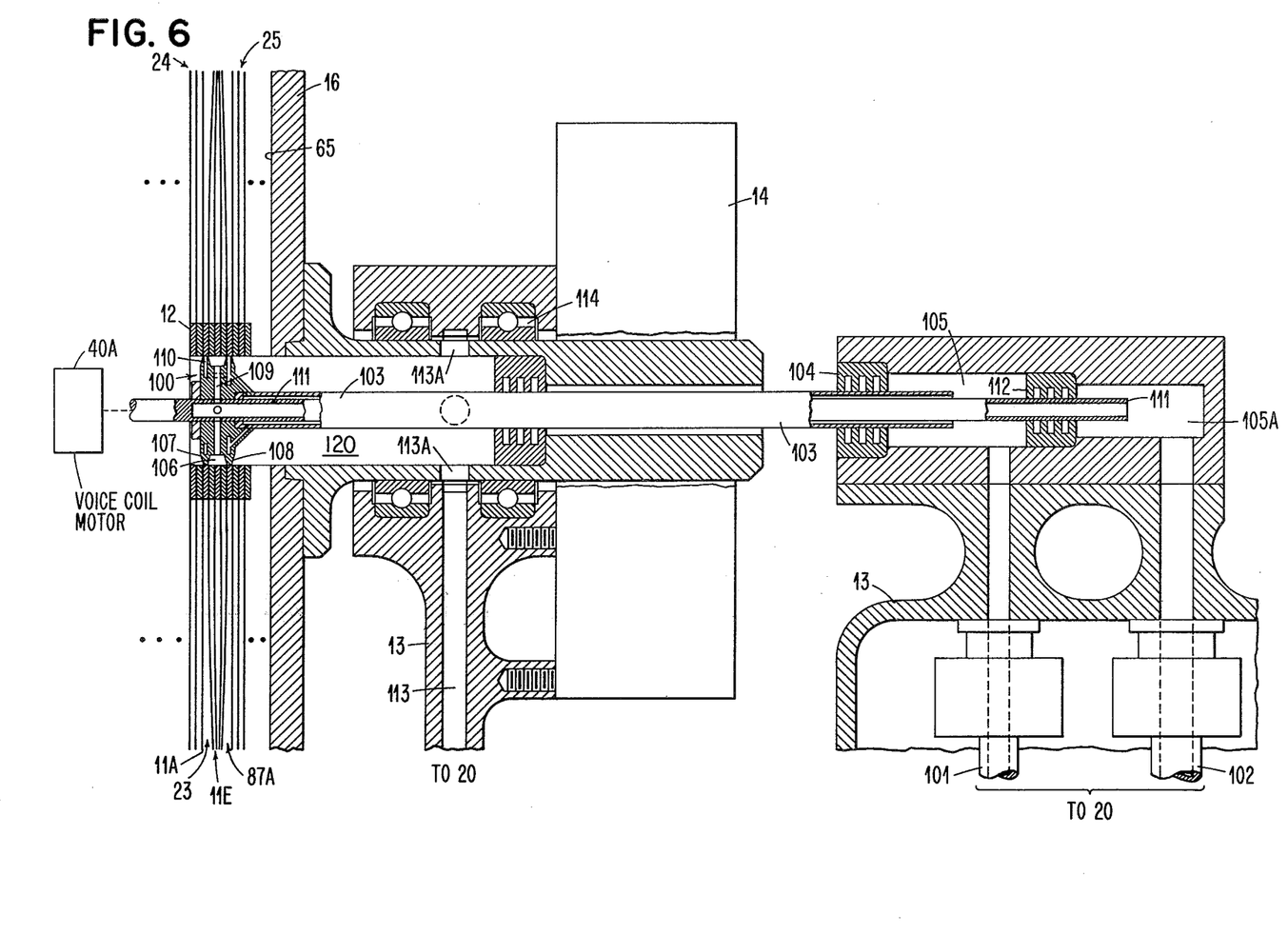
FIG. 6 is a simplified partial diagrammatic cross-sectional view of apparatus employing a preferred form of practicing the present invention.

Referring next to FIG. 6, a preferred piston embodiment of the invention is shown in apparatus as that described with respect to FIG. 4. For facilitating axially locating disks from the inside tubular spindle 12, piston 100 does not rotate with spindle 12. To accomplish this, a suitable clearance is provided between piston 100 and the inner cylindrical wall of tubular shaft 12, a sensing means, optical, or mechanical, electrical or magnetic, (not shown) is installed on non-rotating tube 103 for controlling the voice coil motor (not shown) in a known manner for servo positioning piston 100 to a disk selecting position. For brevity, only the axial end portion adjacent end stabilizing disk 16 is shown, it being understood that the opposite axial end portion is constructed as shown in FIG. 4. The preferred FIG. 6 illustrated apparatus creates openings, as shown in FIG. 5, wherein a small number of axially, closely spaced disks in area 11E provide an annular transducing access opening 23 for accessing a record surface of disk 11A, plus an auxiliary access opening 87A opposite the access opening generating non-rotating piston 100 axially movable inside tubular spindle 12 constructed as shown in FIG. 7. Voice coil motor 40A moves piston 100 as shown in FIG. 4.

Coaxially disposed with respect to tubular spindle 12 is a first air controlling tube 103 extending between air seal 104 and piston 100. Tube 103 axially moves in air seal 104 on frame 13. Frame 13 has a hollow interior forming a plenum 105 which, in turn, is connected to air system 20 (FIGS. 1, 2, 4) via tube 101. System 20 exchanges air with plenum 105 which, in turn, exchanges air with the disks in axial region 11E for causing the air pressure therebetween to reduce to below line 31 for axially moving the disks in region 11E closer together as shown. Disks 11E are stably rotating with reduced air flow and reduced axial spacing.

Piston 100 with the inner surface of tubular spindle 12 creates an annular plenum 106 in fluid communication with the interstices between the disks in region 11E. A plurality of radially extending air passageways 109 provide fluid communication between plenum 106 and the interior of tube 111. For rapid air transfer, piston 100 additionally has front end plate portion 107 in air sealing relationship with the interior of tubular spindle 12, plus a rear end plate portion 108 also in air sealing relationship with the interior wall of tubular spindle 12. To ensure that annular access opening 23 occurs each time piston 100 is positioned as shown, a plurality of air jets 110, which may be circumferential slits formed in front wall 107, are in fluid communication with the interstice forming annular access opening 23. The jet air flows through tube 103 in fluid communication with the air jets 110. Air supply 20 supplies the jet and, in turn, receive jet air flow goes via air passageway 10 and plenum 105A. The bistable inducing air flow via air passageway 102 and tube 111 axially slides in air seal 112 of frame 13. The rest of the disks of the disk stack 10, in regions 24 and 25, is stabilized by air from system 20 via air duct 113, apertures 113A, and the hollow interior 120 of tubular spindle 12 and end plate 16. Rigid end plate 16 is journaled for rotation on frame 13 by bearings 114.

Selection of disk 11A for transducing access is achieved by positioning piston 100, as shown, drawing a vacuum through plenum 105A after or simultaneously with providing a jet of air through ports 110. During axial movements of piston 100 air supply 20 supplies stabilizing air through tube 111 such that the stack of disks is in a stabilized rotational state. This is desirable for reducing wear between the disks. In an alternative operation, the vacuum can be pulled or reduced air flow supplied by air system 20 through tube 111 continuously such that access openings 23 and 87 are seen to travel axially along the pack as piston 100 axially traverses the interior of tubular spindle 12. To rapidly close access opening 23 (and 87) high pressure air flow is supplied past disks 11E via apertures (not shown) in piston 83.

Tubular spindle 12 is preferably constructed as diagrammatically shown in FIG. 7 in partial cross-sectional view. The interior of tubular spindle 12 is a coaxial air passageway 120. The tubular wall of spindle 12 has axially elongated air passageways 121 which are axially extending grooves in fluid communication with central air passageway 120. Each of the grooves, or air passageways 121, also are in fluid communication with the interstice between adjacent record storage disks 11. Each record storage disk is supported by its own individual annular spacer, such as spacers 123 shown in FIG. 7. Each annular spacer 123 has an annular outer shoulder 124. The disks 11 are suitably respectively adhesively secured in the shoulders 124. The axial depth of these shoulders is preferably less than the thickness of the disks 11 such that when a bolt 125 extends axially through the spacers between rigid stabilizing plates 15 and 16, the disks 11 are slightly compressed for ensuring a solid attachment for all the disks to tubular spindle 12. The radial inward portions 126 of each washer 123 has a maximum axial thickness such that those inward portions 126 abut adjacent spacers radially inwardly of each of the disks 11. Such contact controls the clamping force on disks 11 and provides for a rigid solidifying clamping force for the entire stack 10.

Figure 8:
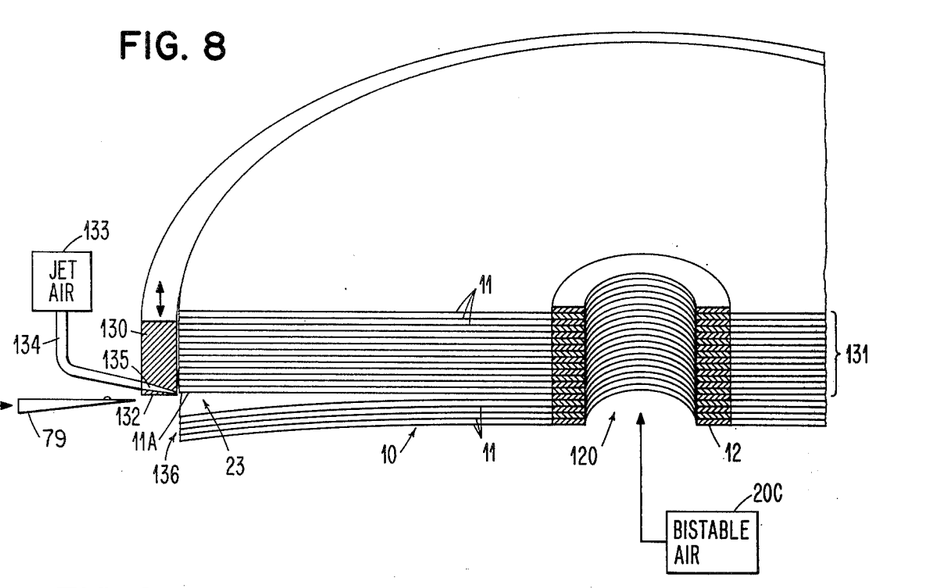
FIG. 8 is a simplified diagrammatic sectional view of an embodiment of the present invention employing peripheral selection techniques.
Figure 9:
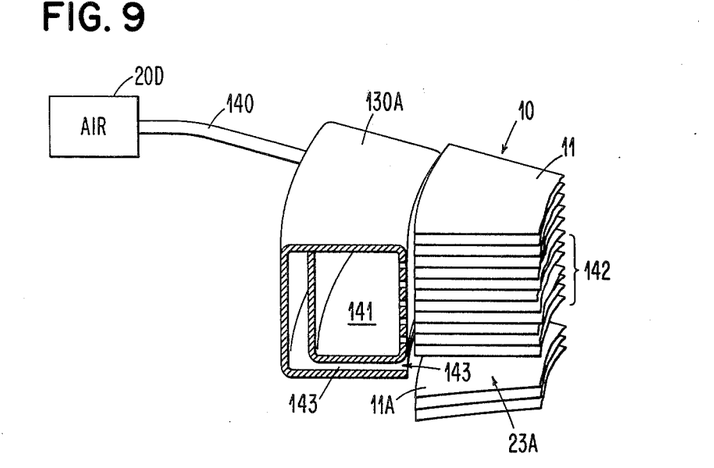
FIG. 9 is a simplified diagrammatic showing of an alternative to the FIG. 8 illustrated apparatus.

FIGS. 8 and 9 show additional alternative embodiments of the invention wherein the fluidic selection of a record disk is performed from the outer periphery rather than from the central hub. In FIG. 8, the storage disk 11A to be accessed by transducer supporting arm 79, is selected by an annular ring 130 (partially shown in FIG. 8) extending around the entire outer circumference of stack 10 of record disks 11. An air source 20C supplies bistable air pressure to the central air passageway 120 of tubular spindle 12. Hence, the entire stack 10 is a at bistable pressure. The purpose of annular ring 130 is to provide back pressure to a small axial region of disk 131 which is substantially coextensive with the axial extent of annular ring 130. It has been found that in a bistable stack 10 of disk 11, the back pressure provided by blocking the outward air flow increases the air pressure between the disks in region 131 to provide stable rotation at 131 in the region of FIG. 3 above line 30. All of the other disks in the stack 10 are operating in the bistable region generally between lines 30 and 31 of FIG. 3. To select a disk 11A, the ring 130 is axially positioned by a carriage (not shown) and as described elsewhere in the referenced copending applications and issued patents such that one axial edge 132 is adjacent disk 11A. A jet air source 133 supplies jet air through a flexible tube 134 to an air jet port 135 integrally formed in annular ring 130 and having a plurality of openings (not shown) spaced around the circumference of stack 10. When positioned as such, a jet of air through tube 134 creates an access opening 23 by axially moving disks in axial region 136 away from disk 11A, which is rotating in a fully spaced stabilized condition. Access arm 79 is then moved into annular transducing access opening 23 for providing record transducing access to disk 11A.

To close access opening 23 without altering any air control from source 20C, ring 130 is merely moved to cover transducer access opening 23, which then creates a back pressure equal to the stabilizing region above line 30 of FIG. 3, thereby closing the transducer access opening. In the alternative, bistable air in source 20C can be activated by means (not shown) to supply stabilizing air into central air passageway 120, thereby raising the pack pressure to be above line 30. In this latter situation, the bistability of stack 10 is preferably operated just below line 30 of FIG. 3, i.e., just into the bistable region and quite close to the stable region. It has been found that, when bistable stacks are used as described in this specification, improved performance is achieved by operating close to the fully spaced stable region. A difficulty in this regard to that the annular access openings 23 tend to close, i.e., tend to assume a stabilized rotational configuration of minimum energy which is represented by a plane perpendicular to the access of rotation of tubular spinder 12. Access opening 23 can be enhanced by inserting a transducer supporting air foil blade or wedge into the access opening. Such an apparatus is shown in Griffiths et al., Ser. No. 480,990, filed June 19, 1974.

In FIG. 8, a second annular ring 130A is designed to operate with a fully stabilized stack 10 of disks 11. The annular ring 130A has a hollow interior connected to an air source 20D by flexible tube 140. To select a storage disk 11A for transducer access, hollow ring 130A is positioned as shown by a carriage (not shown) as above described. When positioned, a vacuum (reverse air flow) is drawn by source 20D via annular plenum 141 in ring 130A. This vacuum reduces the air pressure in the axially aligned disks represented by numeral 142. These disks tend to move together, as above described. To ensure that an access opening is created, as at 23A, a jet of high-pressure air is provided through circumferentially spaced-apart air jet ports 143 integrally formed in ring 130A. These jets of air provide high-pressure air against disk 11A creating an annular transducing access opening in region 143. Closure of opening 23A is providing a back pressure into plenum 141 by increasing the pressure to that of stabilizing pressure or by axially moving ring 130A away from disk 11A to allow the stabilizing air being supplied to the disk 11 to close the annular transducing opening 23A.

Many alternative structures may be successfully employed to achieve sufficient air flow variations for creating an annular access opening 23. Peripheral wedges may pull air away from the outer edges of selected disks to exit the selected disks into a stable or bistable rotational state. Variations of the FIGS. 8,9 illustrated embodiments are alternatives to achieving localized, less than fully spaced, stable rotational states. The disk stack air flow can be controlled to provide a fully spaced stable stack portion adjacent the disk to be transduced, such as denoted by numeral 24, an access opening 23, a closely spaced stable rotational set of disks (such as 11B) adjacent the access opening and the remaining disks in a bistable rotational state (such as in area 25).

While the invention has been particularly shown and described with reference to preferred embodiments thereof, it will be understood by those skilled in the art that various changes in form and details may be made therein without departing from the spirit and scope of the invention.

What is claimed is:

1. Record storage apparatus having a coaxial stack of flexible record disks mounted for rotation with a rotatable spindle, a frame mounting said spindle for rotation, means for supplying fluid for radial outward movement between adjacent ones of said record storage disks in said stack, the improvement including in combination:
said fluid supply means supplying said fluid to establish a given rotational stability state in said stack of disks;
means coaxial with and having a lesser axial extent than said spindle and being movable axially with respect thereto and having a predetermined fluid communicative relationship to a plurality of said disks axially aligned therewith;
said communicative relationship altering said radial outward fluid flow between said axially aligned disks such that rotational stability state other than said given state occurs in said disks axially aligned with said coaxial means;
a first of said rotational states being a fully spaced apart stable rotational state, and a second of said rotational states being less than said fully stable rotational state; and
means at the interface between said disks in said first state and said second state to activate partial axial movement of a radially outward portion of predetermined ones of said disks in said second state away from disks adjacent said interface in said first state, whereby a radial outwardly opening access opening occurs in said stack for accessing a given one of said record storage disks in said first state and which faces said disks adjacent said interface and are in said second state.

2. The apparatus set forth in claim 1 wherein said disks in said second state includes a first plurality of such disks exhibiting a minimal axial spacing rotationally stable state, and
the number of said disks in said second state being substantially less than the number of disks in said first state.

3. The apparatus set forth in claim 2 wherein said disks in said second state include two portions of disks, a first portion, being said first plurality of disks exhibiting said minimal axial spacing stability, and a second portion being others of said disks in said second state being in a bistable stability rotational state and being axially remote from said interface.

4. The apparatus set forth in claim 2 wherein said spindle is a tubular spindle having a central passageway;
said coaxial means including means in air sealing contact with said passageway of said tubular spindle and being axially movable therethrough; and
axially extending means extending outwardly of said tubular spindle for facilitating axial movement of said coaxial means.

5. The apparatus set forth in claim 2 wherein said coaxial means has a limited predetermined axial extent and includes means substantially blocking fluid flow from between said axially aligned disks whereby substantially all said axially aligned disks are in said minimal axial spacing stable rotational state such that said access opening is adjacent one axial end of said coaxial means.

6. The apparatus set forth in claim 2 wherein said coaxial means further includes air jet means extending circumferentially of said disks and being axially aligned at a given interface between disks in said first and second states such that said circumferential annular access opening always occurs adjacent said air jet, said air jet means being disposed adjacent one axial end of said coaxial means.

7. The apparatus set forth in claim 2 wherein said spindle is an axially elongated tubular spindle with an inner annular wall defining a central air passageway extending substantially the length of said tubular spindle; and
said coaxial means including a piston axially movably disposed in said tubular spindle and having an axial extent greater than any axial extent desired for a given circumferential annular transducer access opening such that it has one axial access opening edge of said axially movable piston defines the axial location of the desired circumferential annular transducer access opening, and the remaining axial extent of said piston defining an axial region of said stack movable with said axially movable piston exhibiting a rotational stability state less than said fully spaced stable rotational state.

8. The apparatus set forth in claim 7 wherein said piston includes air flow controlling means extending the entire length thereof and uniformly circumferentially at a given axial position for minimizing air flow adjacent said access opening edge and tending to maximize air flow within the piston axial extent axially opposite said access opening edge such that, at said axially opposite end, pressure differential between disks nonadjacent said piston and disks adjacent said piston are substantially the same.

9. The apparatus set forth in claim 8 wherein said piston includes an air blocking portion axially adjacent said access opening edge and the air flow supplying portion axially intermediate said axially opposite end and said air blocking portion.

10. The apparatus set forth in claim 8 wherein said piston has axial and circumferential walls forming an air plenum, and said circumferential wall exhibiting a given porosity at each axial portion of said piston and said porosity varying from said access selecting edge to said opposite axial end from a minimum porosity to a maximum porosity, respectively.

11. The apparatus set forth in claim 8 further including an axially extending tube in fluid communication and movable with said piston;
means journaling said tube for rotation with said tubular spindle; and
air supply means supplying air to said air passageway in said tubular spindle independent of said plenum in said hollow piston and separate air supply means supplying air to said hollow piston whereby air flow changes in said stack via said plenum in said piston tend to minimize the amount of air flow change.

12. The apparatus set forth in claim 8 wherein said piston has means to vary air flow to said axially aligned disks such that at each such axial end of said piston an annular access opening exists; and
means in said piston for supplying air under a given pressure for ensuring an access opening always appearing at said access opening actuating end.

13. The apparatus set forth in claim 12 wherein said ensuring means consists of a plurality of jet ports in said piston disposed to supply air jets having a positive pressure between disks including a disk to be selected along its record surface portion to be accessed.

14. The apparatus set forth in claim 8 further including a tube coaxially disposed with said tubular spindle and being in fluid communication with a chamber inside said piston and extending axially outwardly of said stack of disks; and
a motor operatively engaged with said stack of disks for rotating same and having an axially extending tubular air passageway in fluid communication with said tube and said air supply means being coaxially disposed with said tube for supplying air therethrough.

15. The apparatus set forth in claim 2 wherein said coaxial means is an annular ring disposed about the periphery of said stack and being axially movable with respect thereto.

16. The apparatus set forth in claim 15 wherein said annular ring includes an annular plenum;
air supply means in fluid communication with said annular plenum for exhausting air therefrom whereby disks axially aligned with said coaxial means tends to move at their peripheral radial extents together for forming an access opening for transducer access to one of said disks exhibiting fully spaced stable rotational characteristics.

17. The apparatus set forth in claim 1 wherein said second state is said given rotational stability state and is in a bistable region of stability wherein said record disks can assume either a maximum or a minimum access spacing at their radial peripheries;
said coaxial means including an annular ring disposed at the periphery of said stack and extending entirely around and being in air-blocking relationship to a predetermined number of disks less than the total number of disks in said stack, and being axially movable whereby fluid flow from said disks axially aligned therewith is restricted creating a back pressure between such disks and raising such disks to said first rotational state of fully spaced-apart stability such that the entire stack of disks is rotating in said bistable mode, while the disks axially aligned with said coaxial means are rotating in said fully spaced-apart stable state; and
accessing means for moving a transducer in operative relationship to one of said disks aligned with said coaxial means.

18. Apparatus set forth in claim 1 further including a rigid stabilizing disk at each axial end of said stack;
actuating means in said coaxial means for initiating a circumferential access opening adjacent a predetermined disk, said predetermined disk always being on a first axial side of said coaxial means adjacent a first one of said rigid disks such that said disks facing said one disk always axially move toward a second one of said rigid disks; and
means controlling axial motion of said coaxial means to be limited to a few disk spaces from said first rigid disk and a greater number of disk spaces from said second rigid disk.

19. Apparatus set forth in claim 18 wherein the axial movement of said coaxial means includes movement to be axially aligned and coaxial with said second rigid stabilizing disks.

20. Compact record storage apparatus set forth in claim 1 further including in combination:
a motor on said frame and operatively and coaxially connected to said spindle for rotating same;
said spindle and said motor having an axially elongated common central air passageway in fluid communication with said fluid supply means for receiving fluid therefrom via said motor; and
said spindle including spacers in said spindle which create radial air passageways through said spindle.

21. Record storage apparatus having a coaxial stack of axially spaced-apart flexible record disks mounted for rotation with a rotatable spindle, means for supplying fluid to flow radially outwardly between said disks;
means for partially axially moving a given number of said disks for creating a transducing access opening;
the improvement including the combination:

fluid controlling annular means disposed coaxial of said stack;
support means adjacent a first axial end of said stack having axially movable extending means axially movably supporting said fluid controlling annular means for axial motions substantially coextensive with the axial extent of said stack;
axial motion control means in said support means limiting said axial motions to a first number of disks from one end of said stack and a second number of disks from the end of said stack axially opposite said one end, said first number being less than said second number; and
said second number being not less than approximately said given number.

22. Record storage apparatus set forth in claim 21 wherein said first number is not greater than 10.

23. The record storage apparatus set forth in claim 21 further including in combination:
said rotatable spindle being a tubular spindle
said fluid controlling annular means including piston means axially movably disposed in said tubular spindle;
a frame;
a slide movably mounted on said frame adjacent a first end of said stack and supporting said fluid controlling annular means for axial movements in said tubular spindle;
air sealing means at said first end for sealing said tubular spindle;
a motor mounted on said frame adjacent a second axial end of said stack and operatively connected to said tubular spindle for rotating said stack as a unit;
first and second rigid stabilizing plates mounted for rotation on said tubular spindle, respectively, at said first and second axial ends of said stack; and
said slide capable of moving said piston means from immediately adjacent said second stabilizing means to immediately adjacent said first stabilizing means such that any annular access opening generated by said fluid controlling annular means is axially closer to said second stabilizing means than the axial extreme annular opening is to said first stabilizing means.

24. The record storage apparatus set forth in claim 23 further including fluid conduit means coaxial of said motor and extending to said tubular spindle for supplying fluid to said tubular spindle for radial outward flow therefrom between the present position of said piston means and said second stabilizing means, and further having conduit means extending to the axial opposite end of said tubular spindle adjacent said slide for supplying fluid to said tubular spindle on the axially opposite side of said piston means.

25. The record storage apparatus set forth in claim 24 wherein said means for supplying fluid supplies sufficient fluid for establishing a fully spaced stable rotation state in said stack; and
said fluid controlling annular means altering said fluid pressure in the interstices between adjacent disks axially aligned with said piston means to reduce the rotational state to at least a bistable state and a fully closed state adjacent one axial end of said piston means which is axially closest to said second stabilizing plate such that the annular access opening for transducing access is axially intermediate disks in said fully spaced rotational state and a limited number of disks in said closed stable rotational state axially adjacent said first end of said piston means.

26. The record storage apparatus set forth in claim 25 further including a carriage on said frame movable axially of said stack;
a radially movable carriage on said first-mentioned carriage radially movable toward and away from said stack; and
a transducer and transducer supporting arm on said radial carriage for movement into and out of said annular access opening for transducing signals with respect to one of said disks axially juxtaposed to said annular access opening and which is substantially in a fully spaced rotational state.

27. The record storage apparatus set forth in claim 24 wherein said stabilizing end plates are rigid plates;
said second stabilizing end plate having an aperture coaxial of said tubular spindle less than the radial extent of said piston means; and
said first rigid stabilizing plate having an aperture for receiving the piston means.

28. For record storage apparatus having a coaxial stack of flexible record disks mounted for rotation on a common tubular spindle, said spindle having fluid outlets between adjacent ones of said disks, means for supplying fluid to inside said spindle under a given pressure and flow whereby said fluid flows radially outwardly between said disks for stabilizing rotation thereof in a fully spaced rotational state;
the improvement being apparatus for generating a peripheral transducer access;
first annular means disposed coaxial of and axially movable with respect to said tubular spindle and having an axial extent substantially equal to an axial length occupied by a first predetermined number of said disks and being in operative relationship to said first predetermined disks to substantially reduce air flow from between disks juxtaposed thereto;
second annular means operatively connected to said first annular means for axial movement therewith and disposed on a first axial side of said first annular means and being coaxial of said tubular spindle, and having an axial extent equal to an axial length occupied by a second predetermined number of record disks, air flow means in fluid communication with said second annular means for modifying air flow between said disks axially juxtaposed thereto; and
means for positioning said first axial means in a predetermined axial relationship to a given one of said record disks for creating a transducer access opening thereat.

29. The record storage apparatus set forth in claim 28 further including in combination:
said second annular means having an annular air chamber for assisting in stabilizing disks axially aligned therewith in a rotational state different from the rotational state of disks unaligned with either said first or second annular means.

30. The record storage apparatus set forth in claim 28 wherein said transducer access opening occurs at a first axial end of said first annular means axially opposite said second annular means; and
said annular access opening being axially interposed between disks unaligned with said annular means being in said fully spaced rotational state and disks axially aligned with said first annular means which are in a closed rotational state.

31. The record storage apparatus set forth in claim 30 wherein said annular means are movable substantially coextensively with the axial extent of said stack, with the axial movement of said first end for creating said annular access opening being closer to one end of said stack in its extreme position than from said second and axially opposite end when in a second extreme position of its axial motion.

32. The record storage apparatus set forth in claim 28 wherein said first and second annular means have a given axial extent with a predetermined linear change in air flow control extending from a first axial end portion to a second axial end portion whereat the disks adjacent said first axial end portion tend to collapse toward said closed stable rotational state for creating an annular access opening axially interposed between disks in said fully spaced rotational state and said disks in said closed rotational state.

33. Record storage apparatus having a coaxial stack of flexible record disks mounted for rotation on a tubular spindle, said spindle having radial fluid outlets axially between said disks, means for supplying fluid to said tubular spindle for ultimate radial outward flow between said disks for stabilizing said disks in a fully spaced rotationally stable state;

the improvement including in combination:
first coaxial means coaxially disposed and axially movable with respect to said coaxial stack of disks and operatively associated with said disks to block said fluid from first flowing between predetermined ones of said record disks; and
second coaxial means operatively associated with said record disks and said first coaxial means to establish a second fluid flow condition in second predetermined ones of said disks axially adjacent said first predetermined ones of said record disks such that a transducing access opening occurs axially intermediate said first coaxial means and an immediately, axially adjacent, fully spaced, rotationally stabilized, flexible, record disk.

34. The method of operating record storage apparatus including axially separating a peripheral portion of first and second flexible disks in a stack of such disks mounted for rotation on a common spindle, means inducing radial outward air flow past said disks to a fully spaced stable rotational state;

the improvement including the steps of:
reducing air flow to a collapsed disk space flow in a first axial proximity to said first and second disks while maintaining said induced air flow to disks adjacent said first disk axially opposite said second disk; and
including establishing a bistable disk rotational state in axial juxtaposition to said first axial proximity remote from said first disk.

35. The method of operating record storage apparatus set forth in claim 34 further including supplying a radially direct circumferentially substantially continuous jet of air simultaneously with reducing air flow to the collapsed disk spacer flow, said air jet being directed toward an axial interstice between disks in said fully spaced rotational state and disks being placed in a collapsed disk spaced rotational state by said reduced air flow.

36. The method set forth in claim 34 further including reducing air flow in a manner to produce an axial gradient from said collapsed disk space rotational stable state through a bistable disk rotational state such as to induce an annular transducing access between a disk in said fully spaced rotational state and a disk in said collapsed disk space rotational state, said disk being axially adjacent with no intermediate disk such that said disks in said collapsed disk space axial state tend to move axially toward the disks in said bistable disk rotational state.

37. The method set forth in claim 34 further including the steps of maintaining said radial outward air flow for maintaining said fully spaced stable rotational state in all disks but a limited number of disks not greater than fifty irrespective of the axial position of said desired transducing access opening.

38. The method set forth in claim 34 further including the steps of limiting said collapsed disk space flow to disks having a first number of disk spacings from a first axial end of said stack of disks and a second number of disks from a second axial end of said disks, said first number being smaller than said second number; and said collapsed disk space flow always being toward said second axial end from a disk to be transduced.

39. The method of creating a transducing access to a record surface on a first axial side of a first disk in a stack of commonly rotating flexible record disks having a predetermined radial outward air flow to assist in a fully spaced stabilizing rotation of each said disks, the step of:
altering air flow on said first axial side immediately axially adjacent said first axial disk to an air flow condition wherein predetermined disks on said one axial side tend to axially move together at their peripheries.

40. The method set forth in claim 39 further including the step of supplying a jet of air under greater pressure than said radially outwardly flowing air along said one axial side which assists in said fully spaced stabilizing rotation in a substantially circumferential continuous manner at an axial interstice between disks whereat said transducing access is to be generated.

41. The method of creating a transducing access to a record surface on a first axial side of a first disk in a stack of commonly rotating flexible record disks having a predetermined radial outward air flow to assist in stabilizing rotation of each of said disks, the step of:
establishing a disk space collapsible air flow state immediately axially adjacent said first axial side of said first disk for a predetermined number of disks disposed on said first axial side of said first disk.

42. Record storage apparatus having a coaxial stack of axially spaced-apart flexible record storage disks mounted for rotation with a tubular spindle having radial fluid conduits opening between said disks, means supplying fluid to said spindle for radial outward flow past said disks for stabilizing rotation thereof in a given rotationally stable state, the improvement comprising:
coaxial means axially movably disposed with respect to said stack of disks and having an axial extent of a predetermined number of disks for altering fluid flow between said predetermined number of disks to a rotational state other than said given state whereby a transducer access opening occurs adjacent an axial end of said coaxial means.

* * * * *